United States Patent [19]
Drisko et al.

[11] Patent Number: 5,933,523
[45] Date of Patent: Aug. 3, 1999

[54] MACHINE VISION METHOD AND APPARATUS FOR DETERMINING THE POSITION OF GENERALLY RECTANGULAR DEVICES USING BOUNDARY EXTRACTING FEATURES

[75] Inventors: Robert Drisko, Concord, Mass.; Toshimitsu Motoyama, Mitaka, Japan; Ivan A. Bachelder, Newton, Mass.

[73] Assignee: Cognex Corporation, Natick, Mass.

[21] Appl. No.: 08/819,875

[22] Filed: Mar. 18, 1997

[51] Int. Cl.⁶ .................................. G06K 9/00; G06K 9/48
[52] U.S. Cl. ........................... 382/151; 382/199; 382/291
[58] Field of Search ............................ 364/570; 382/286, 382/289, 292, 141, 145, 146–147, 151, 199, 276–277, 293, 291, 295–296

[56] References Cited

U.S. PATENT DOCUMENTS

| | | | |
|---|---|---|---|
| 4,980,971 | 1/1991 | Bartschat et al. | 29/833 |
| 5,113,565 | 5/1992 | Cipolla et al. | 382/8 |
| 5,371,690 | 12/1994 | Engel et al. | 364/570 |
| 5,418,892 | 5/1995 | Aghajan et al. | 395/118 |
| 5,475,766 | 12/1995 | Tsuchiya et al. | 382/144 |
| 5,506,682 | 4/1996 | Pryor | 356/375 |
| 5,696,848 | 12/1997 | Patti et al. | 382/254 |
| 5,761,326 | 6/1998 | Brady et al. | 382/103 |
| 5,796,868 | 8/1998 | Dutta-Choudhury | 382/199 |
| 5,845,007 | 12/1998 | Ohashi et al. | 382/199 |

OTHER PUBLICATIONS

Cognex 4000/5000 SMD Placement Guidance Package User's Manual, rev. 3.2, 1996. Ch.7, pp. 269–310.
Cognex 4000/5000 SMD Placement Guidance Package User's Manual, rev. 3.2, 1996. Ch.11, pp. 357–372.
Cognex 3000/4000/5000 Programmable Vision Engines Image Processing, rev. 7.4, 1996. Ch. 2, pp. 58–59.
Cognex 3000/4000/5000 Programmable Vision Engines Vision Tools, rev. 7.4, 1996. Ch.11, pp. 484–486.

*Primary Examiner*—Leo H. Boudreau
*Assistant Examiner*—Bhavesh Mehta
*Attorney, Agent, or Firm*—Anthony Miele

[57] ABSTRACT

Determining the position of a generally rectangular device is achieved by performing subsampling of image data, thresholding of the subsampled data, extraction of boundary features based on the output of the thresholding, calculation of correspondence between extracted boundary features and the generally rectangular device, and a final fit against a model of the generally rectangular device. Correspondence between the boundary features of the image and the generally rectangular device is performed by locating points in the extracted boundary feature which may correspond to corners of the generally rectangular device, removing those points which correspond to known objects other than the generally rectangular device, removing those points likely to belong to unknown objects, and fitting the points to an input model of the generally rectangular device to determine its position.

42 Claims, 8 Drawing Sheets

MACHINE VISION METHOD AND APPARATUS FOR DETERMINING THE POSITION OF GENERALLY RECTANGULAR DEVICES USING BOUNDARY EXTRACTING FEATURES

BACKGROUND OF THE INVENTION

1. Reservation of Copyright

The disclosure of this patent document contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

2. Field of Invention

The present invention relates to machine vision systems, and more particularly to machine vision systems for recognizing the position of generally rectangular devices.

DESCRIPTION OF BACKGROUND INFORMATION

Surface mounted devices (SMD) are mounted on the surface of printed circuit boards (PCB). They are used to control devices ranging from children's toys to complex computer systems. The most common type of SMD is known as a "chip" device, generally referring to a device that is approximately rectangular in shape. Chip devices vary greatly in size.

Like many manufacturing processes, the process used for mounting SMDs on PCBs has been automated to enhance speed and efficiency. However, unlike many manufacturing processes, accuracy is critical to the process of mounting SMDs because SMDs will not be properly electrically connected when inaccurately mounted. The equipment used to automate the SMD mounting process must therefore be very precise in order to avoid inaccurate placement and damage resulting therefrom. Likewise, the position of SMDs to be mounted must be very precisely determined.

Machine vision systems are commonly used for determining the position of SMDs while handled by mounting equipment. For instance, systems such as front-light and back-light inspection systems have been used to locate SMDs, to distinguish SMDs from the background, to determine their exact position, and to verify manufacturing tolerance compliance. Front-light inspection systems generate images based on light emanating from the camera side of an SMD and reflected back from the SMD. In these systems, a two-stage process has conventionally been used in an attempt to quickly and accurately determine SMD position. That two-stage process includes a coarse part location (CPL) process followed by a more precise fine part location (FPL) process.

Figure 1:
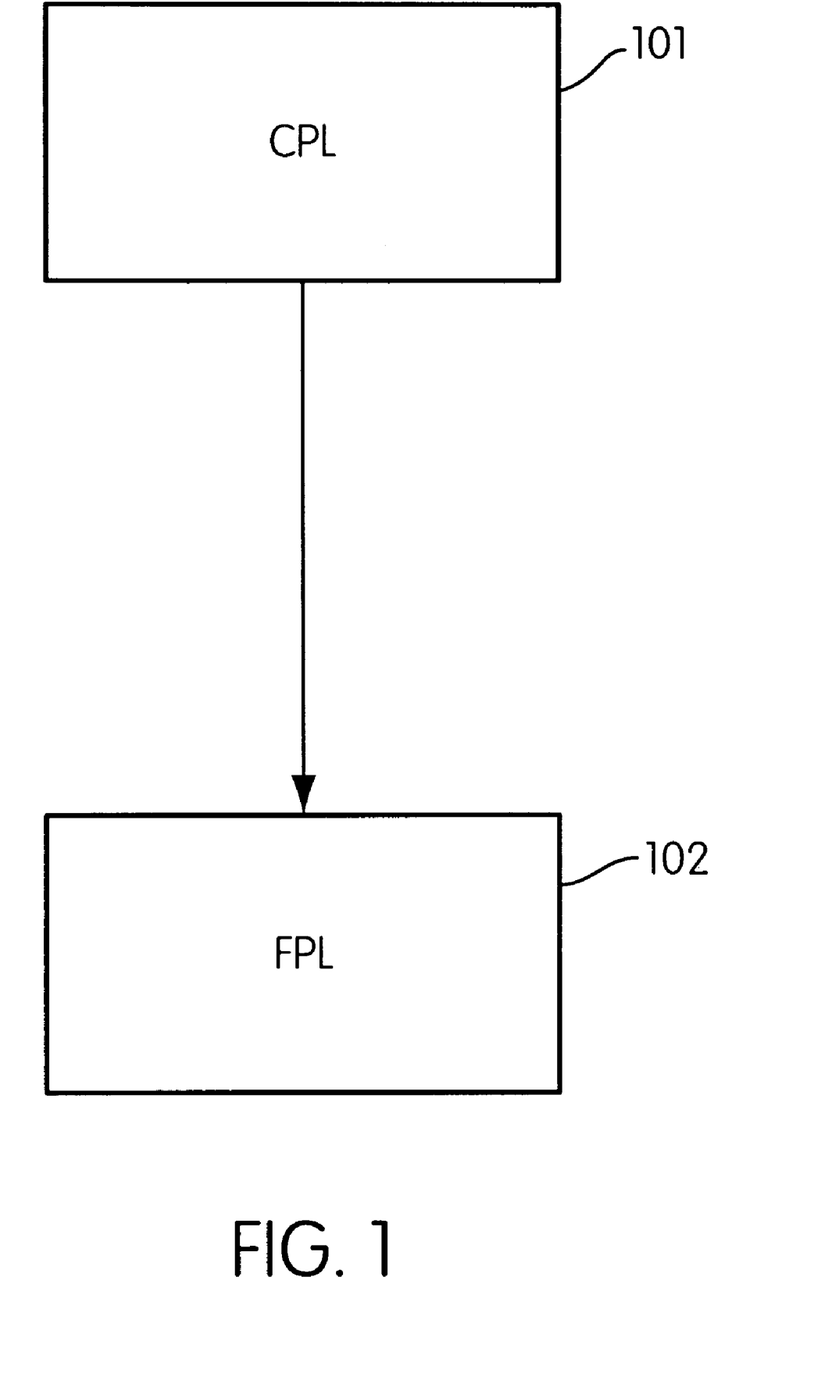
FIG. 1 is a block diagram illustrating a conventional two-stage process for determining the location of an article.

FIG. 1 shows an overview of the conventional two-stage process including CPL process 101 and FPL process 102. Based on input including image data and an initial estimate of position having a large uncertainty, the CPL process estimates SMD position to effectively reduce uncertainty associated therewith. Using the more accurate position output from CPL process 101, FPL process 102 calculates a chip location having a very small uncertainty based on the image data.

The CPL process is used to rapidly estimate SMD position before executing the time-consuming FPL process to determine a more exact SMD position. Using this two stage approach, the FPL process is focused on areas identified in the CPL process, rather than on the entire image. As such, the conventional two-stage test is believed to improve efficiency by reducing processing time.

Figure 2:
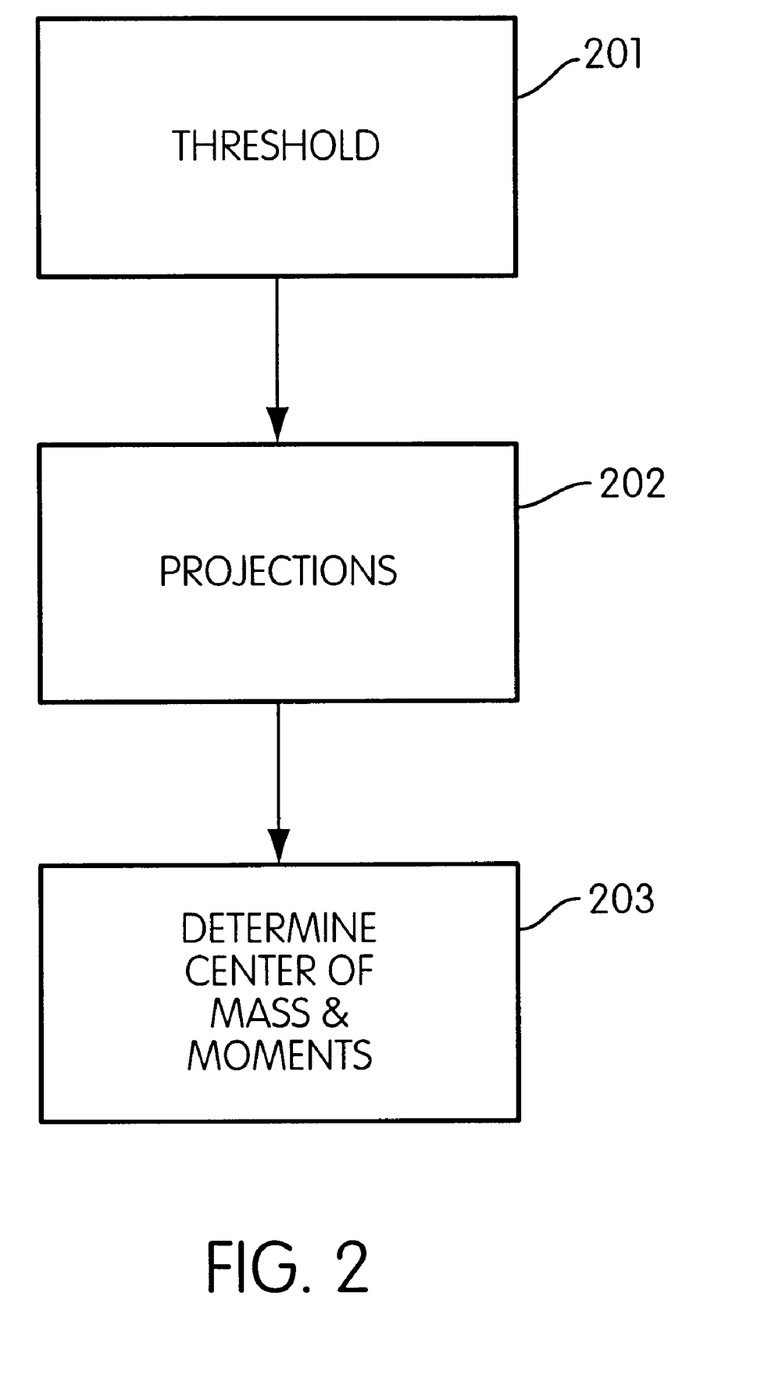
FIG. 2 is a block diagram illustrating a conventional coarse part location (CPL) process performed as the first part of the process shown in FIG. 1.

Some conventional systems perform CPL processing based on global parameters, as indicated in FIG. 2. For instance, at 201 of FIG. 2, thresholding is performed on input image data using known techniques to identify image regions corresponding to portions of an object (for example, portions of an SMD) detected in the image. Collections of image points representing devices detected in the image are projected as blobs at 202. Then, at 203, global characteristics such as center of mass and moments are calculated for the blobs, and those global characteristics are used to determine the position of the SMD.

However, due to their reliance upon global characteristics, the conventional systems mentioned above have been particularly sensitive to the presence of features in the image not corresponding to an SMD being detected. For instance, global calculations such as center of mass calculations become unreliable if the image includes features of the mounting equipment, such as the nozzle used to pick up an SMD. Specifically, in front light situations, the SMD and nozzle may show up in the image with nearly the same intensity (gray value) because nozzles of the mounting device used to pick up SMDs are generally circular in nature and sometimes made of metal. The nozzle may therefore show up in the image and it may not be readily distinguishable from the SMD. Furthermore, regions believed to not correspond to the SMD, such as regions where nozzle features are expected, should not be disregarded because global calculations like center of mass may be significantly changed by disregarding any real SMD image data that may fall within these regions.

As an alternative to systems determining SMD position based on global statistics such as those described above, other conventional systems attempt to determine SMD position by matching local features of an SMD model to an input image of an SMD. For instance, one traditional approach is to locate corners in an image and then compare these corners to a model of SMD corners (for example, via correlation). Another traditional approach is to use an edge tool to interpret geometric features of the image, and to compare the geometric features to an input model including similar features. Each of these alternatives requires extensive processing which may be time consuming or memory intensive. In addition, each of these alternatives requires an accurate, detailed model of the SMD and/or its features which is frequently not available since SMDs in production generally have rounded corners that are variable and consequently difficult to model. There exists a need for an improved system which can move, make quickly and/or more accurately detect the position of articles such as SMDs based on geometric characteristics of the article.

Like the conventional systems relying on global characteristics, the accuracy of each of the above-described systems based on geometric characteristics may be compromised when features of the mounting device (for example, the nozzle) are detected in the image. That is, geometric systems determine the SMD position based on physical features of blobs identified within an input image. Because the physical features of blobs are changed when non-SMD features show up in the image, the SMD position detected will also be changed by non-SMD features that show up in the image, introducing large errors in the resulting position detection. There exists a need for a system which can detect the position of articles such as SMDs without being adversely affected by the effects of image data corresponding to non-SMD devices, such as the nozzle in an SMD mounting process.

SUMMARY OF THE INVENTION

The present invention is provided to improve upon the speed and/or accuracy with which machine vision systems detect and assess the position of an article. The present invention may be further provided to reduce or eliminate the influence of non-article features when assessing the position of an article. In order to achieve these ends, one or more aspects of the present invention may be followed in order to bring about one or more specific objects and advantages, such as those noted below.

One object of the present invention is to provide a system that detects article position using imaging techniques that reduce the effects of features in an image which do not correspond to the article.

Another object of the present invention is to provide a system for determining orientation of an article by determining a correspondence between features of the article found in an input image and similar features in a corresponding model.

A further object of the present invention is to provide a system for verifying manufacturing tolerances using a model of a good article.

The present invention, therefore, may be directed to a method or system, or one or more parts thereof, for facilitating the determination of article position.

According to the present invention, boundary points are determined for an acquired image of a generally rectangular device. The location of the generally rectangular device in the image can be determined by comparing a plurality of the boundary points to each other. Alternatively, the location of the generally rectangular device in the image can be determined by rotationally transforming the boundary points into an extents coordinate space based on an expected orientation of the device, determining extents points in each axial direction of the extents coordinate space, and determining a location of the device based on the extents points.

The location of the generally rectangular device can be determined with regard to orientation, position or both.

In determining the location of the device, the corners of the device may be identified. This may be accomplished by identifying extents points in an extents coordinate space that is defined based on an estimated orientation of the rectilinear device. The extents coordinate space may be defined as being offset from the estimated orientation of the device.

The invention may be implemented as a method or a system for performing part location, or as a computer-readable media tangibly embodying a program of instructions, executable by a machine to perform part location.

BRIEF DESCRIPTION OF THE DRAWINGS

The above and other objects, features, and advantages of the present invention are further described in the detailed description which follows, with reference to the drawings by way of non-limiting exemplary embodiments of the present invention, wherein.

DETAILED DESCRIPTION OF AN EMBODIMENT OF THE PRESENT INVENTION

Figure 3A:
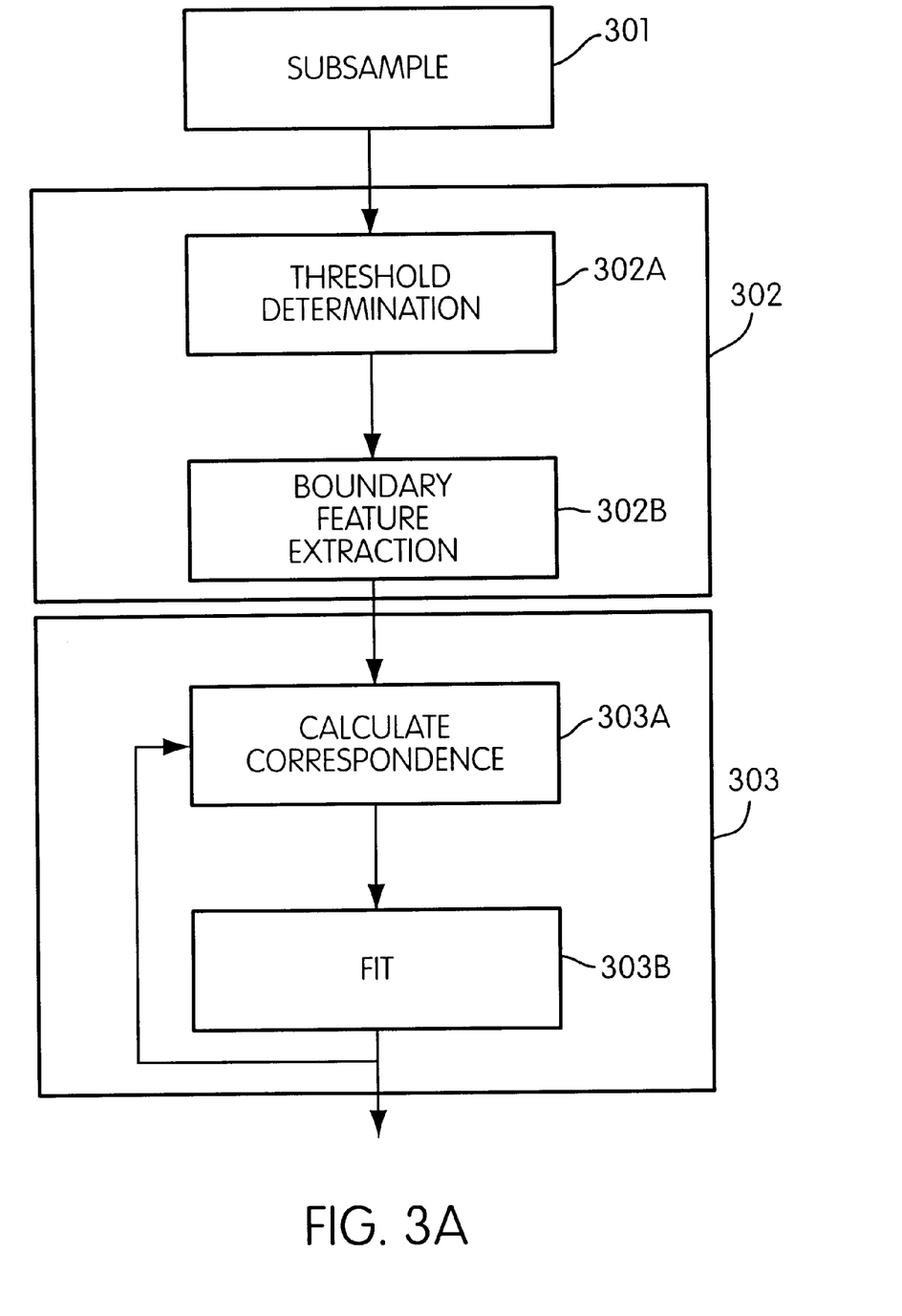
FIG. 3A shows a block diagram illustrating a coarse part location (CPL) process performed in accordance with the illustrated embodiment of the present invention.

FIGS. 3A–4E illustrate an embodiment of the present invention. Specifically, FIG. 3A is a block diagram showing various processes of the illustrated embodiment during a coarse part location (CPL) process, and FIGS. 4A–4E show examples of an image that is manipulated according to the CPL process of FIG. 3A.

Figure 3B:
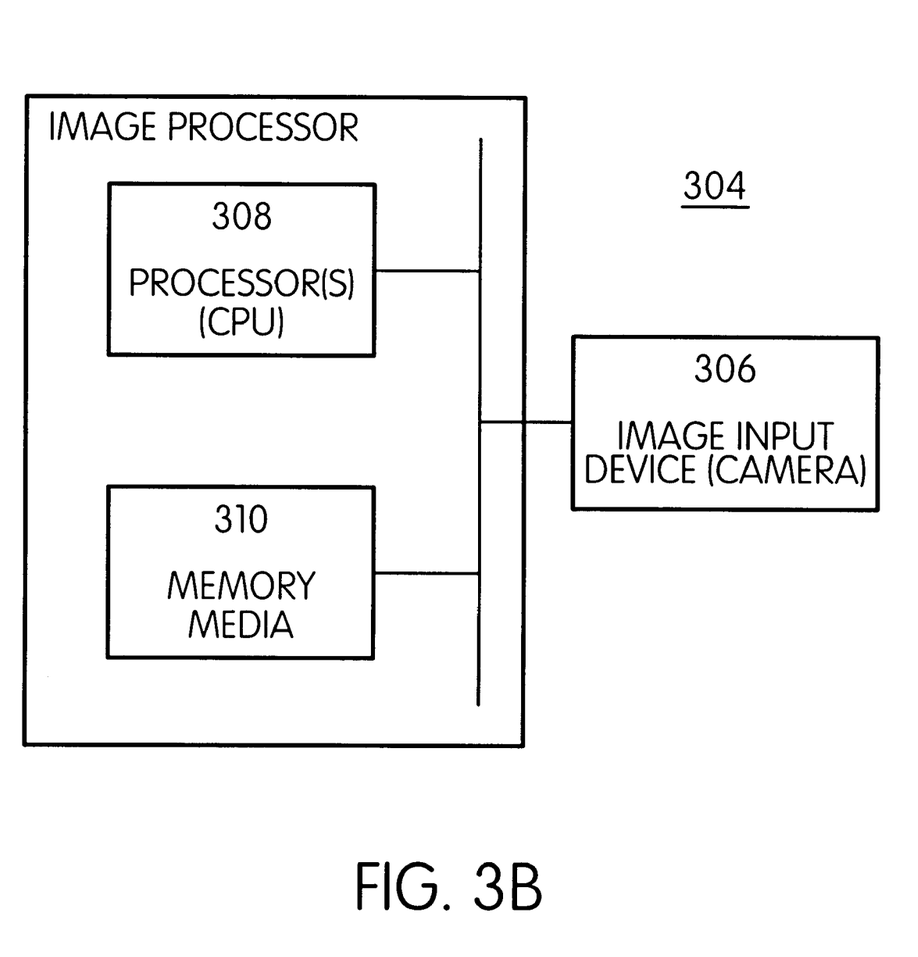
FIG. 3B is a block diagram illustrating aspects of a typical image processor on which the present invention operates.

As shown in FIG. 3B, a typical image processor 304 includes an input device such as a camera 306. The image processor 304 also includes a processor such as CPU 308 and memory 310. The processor 308 may be a special purpose image processor or it may be a general purpose processor. The memory 310 may comprise various types of memory, including RAM, external memory devices such as disks, and the like. Images from the input device 306 are stored in the memory 310 and processed by the processor 308.

The present invention can be implemented as part of the processor 308 or as a program residing in memory 310 and running on processor 308, or as a combination of program and specialized hardware. When in memory 310, the program can be in a RAM, a ROM, an internal or external disk, a CD ROM or the like. In general, when implemented as a program or in part as a program, the program can be encoded on any computer-readable medium.

As previously described, the CPL process is the first stage of a two-stage process used to estimate the position of a generally rectangular device before performing a FPL process to determine the exact position of that device. Of course, if coarse position identification is all that is necessary, FPL need not be performed.

A device is a generally rectangular device if at some scale or some degree of defocus, the general contours describe that of a rectangular object. Specifically, when imaging with low resolution or when some other defocusing technique is employed, details along the perimeters of an object may not be distinguishable and the general contours of the object may therefore generally describe a basic geometric form. For instance, when imaged with low resolution, the general contours of objects such as chips generally describe rectangular objects. Examples of other generally rectangular devices include some large leaded devices (devices with a large number of protruding leads), ball grid arrays, flip chips, and any nearly rectangular objects including, for example, some SMD devices. Inputs to the CPL process of FIG. 3A include image and calibration data, presentation angle and uncertainty, modeling constraints, and perhaps nozzle information.

Figure 7:
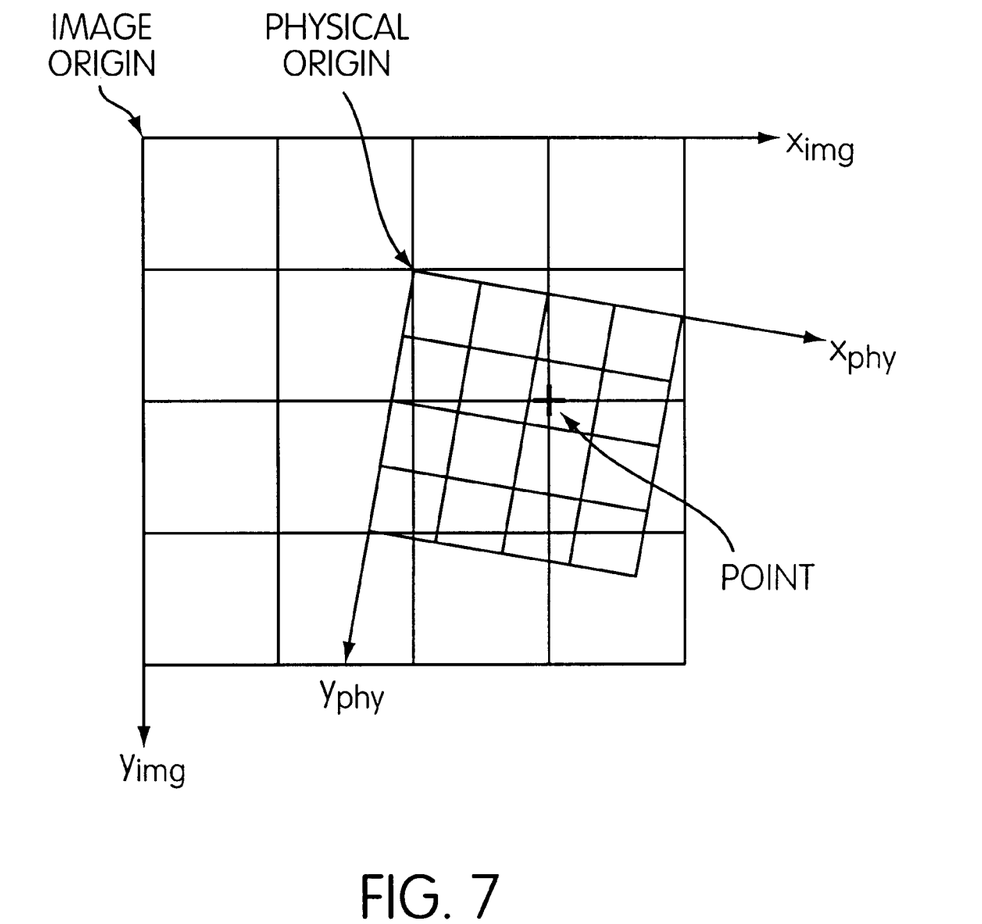
FIG. 7 illustrates an exemplary relationship between the image coordinate space and the physical coordinate space.

Image data is collected in an image coordinate space ("image space") that is defined by the field of view of the device used to collect the image data, for example, a camera. Calibration data is defined through a calibration relating image data in the image coordinate space to a physical coordinate space ("physical space"), the physical coordinate space being defined with reference to the mounter used to place generally rectangular devices on printed circuit boards (PCB). Conventional calibration techniques are described in Chapter 7 of *SMD Placement Guidance Package User's Manual*, Release 3.2, herein incorporated in its entirety by reference. FIG. 7 illustrates an exemplary relationship between the image coordinate space ($X_{img}$, $Y_{img}$) and the physical coordinate space ($X_{phy}$, $Y_{phy}$).

The presentation angle of the device describes an expected initial angular rotation of device coordinate space axes relative to the physical coordinate space axes. The x and y axes of the device coordinate space are typically parallel and perpendicular with the long edge of a generally rectangular device, respectively. The presentation angle may be derived or updated based on previously executed processes, it may be related to the position of equipment such as the mounter or camera, or it may be set according to predetermined data or a fixed reference point. Uncertainty reflects a degree of error in the expected initial angular rotation defined by the presentation angle. For generally rectangular devices, angular uncertainty in the presentation angle should not exceed ±45°, and preferably should not exceed ±35°.

Modeling constraints describe user-specified criteria which may include any distinguishing criteria, but which generally includes geometric device features such as device dimensions. Nozzle information generally identifies a position of the nozzle within the image space.

Figure 4A:
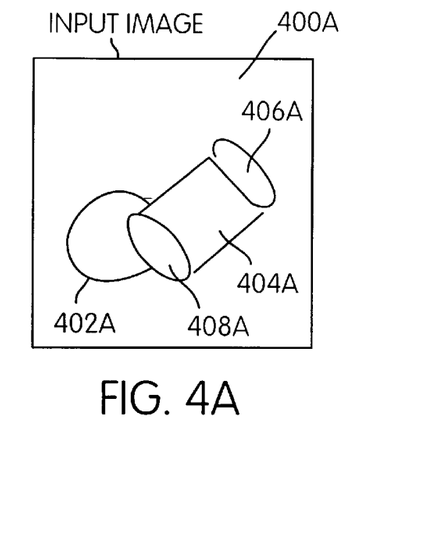
FIGS. 4A–4E show examples of an image that is processed according to the process of FIG. 3A.

The input image, as shown in FIG. 4A, comprises a background part 400A which is generally dark in a frontlit inspection system, a depiction 402A of some or all of the nozzle of the mounter and a depiction of the actual SMD device. The depiction of the device comprises a depiction 404A of the device body and depictions 406A of the device's leads.

At 301 of the CPL process illustrated by FIG. 3A, the amount of image data used for subsequent calculations is reduced through subsampling. Subsampling is performed at 301 according to the optimal subsampling algorithm described in an application entitled, "Constraint Satisfying Dynamic Image Subsampler", which Application is filed concurrently herewith on March 18 in the names of Robert Drisko and Ivan Bachelder, and which Application is hereby expressly incorporated by reference in its entirety. However, other conventional subsampling techniques, such as Gaussian subsampling, could also be used to perform the subsampling at 301.

Figure 4B:
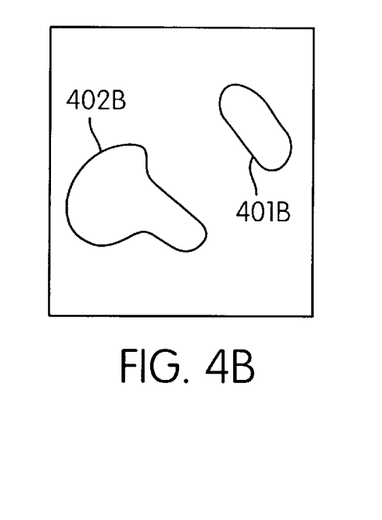

At 302, thresholding is performed on the subsampled image data, and boundary features of the subsampled image are extracted. Preferably, at 302A, a thresholding process is performed on the subsampled image data using, for example, an illumination histogram method such as Cognex Intensity Locator (CIL), or an edge contrast-based method such as Cognex Edge Enhanced Threshold (CEET), both of which are described in the *Cognex* 3000/4000/5000 *Programmable Vision Engines* manual and the Image Processing and *Vision Tools* manuals, version 7.4, each of which are also hereby expressly incorporated by reference in their entirety. Thresholding results in segmentation of only regions within an image that have grayscale values above a threshold. The image generated at 302A may include regions having device and non-device features. FIG. 4B shows the output of an exemplary thresholding process, such as CIL, applied to the image of FIG. 4A. The exemplary threshold image shown in FIG. 4B includes a region 401B corresponding to a chip lead (406A in FIG. 4A), and a region 402B corresponding to a combination of a chip lead (408A in FIG. 4A) and the nozzle (402A in FIG. 4A) of the mounter. However, in a front-light system, regions generated after thresholding may include, for example, only the chip leads, only chip leads and the chip body, only the chip leads and the nozzle, or a combination of the chip leads, the chip body and the nozzle.

Figure 4C:
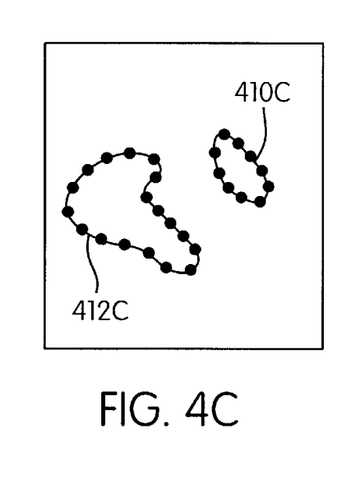

Features of the segmented regions generated at 302A are identified at 302B. In the illustrated embodiment, a boundary feature extraction method is employed to identify boundary features along each surface of each region in the threshold image, as shown in FIG. 4C which shows the boundary 410C of region 401B (of FIG. 4B) and the boundary 412C of region 402B (of FIG. 4B). However, alternative feature identification methods may be used so long as points around the corners of each region are identified. Exemplary feature extraction processes include run-length encoding tools such as Cognex Region Image Processing (CRIP) or boundary tracking software such Cognex Boundary Tracker (CBT), both of which are described in the *Cognex* 3000/4000/5000 *Programmable Vision Engines* manual, Release 3.2, and the *Image Processing* and *Vision Tools* manuals, Version 7.4. Feature extraction may alternatively be performed by, for example, an edge detector followed by a filter which detect edge contrast or illumination change.

After the processing at 302, the CPL process proceeds to 303 where the position of the generally rectangular device is identified based on the output of the processing at 302, nozzle information and model information. The processing at 303 is described in two stages, namely identifying boundary features corresponding to features of the generally rectangular device (at 303A), and fitting the identified features to a model of the generally rectangular device (at 303B).

Figure 4D:
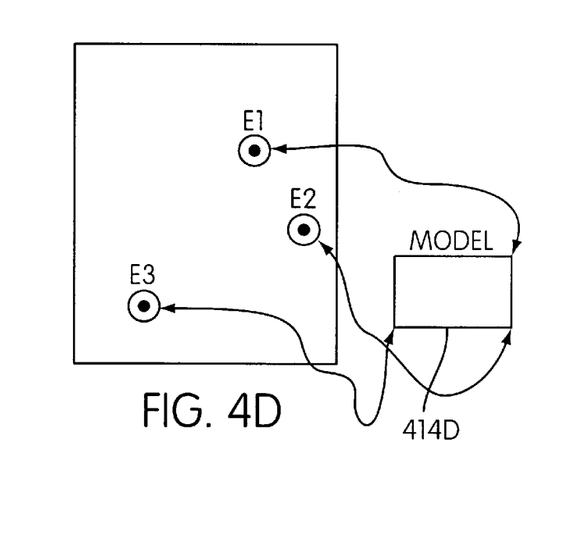

At 303A, correspondence is determined between generally rectangular device features and the output of the processing at 302. As described in more detail with respect to FIGS. 5 and 6A–6F, the illustrated embodiment specifically determines correspondence between the boundary features output at 302 and the corners of the generally rectangular device. For instance, as shown in FIG. 4D, the boundary features in FIG. 4C (output of the processing at 302) corresponding to the corners of the generally rectangular device are identified. As shown, only three of the boundary features (E1, E2, E3) from the processing at 302 are identified as corresponding to the corners of the generally rectangular device since the boundary features most closely corresponding to the fourth corner actually correspond to the nozzle (depicted as 402A in FIG. 4A).

Figure 4E:
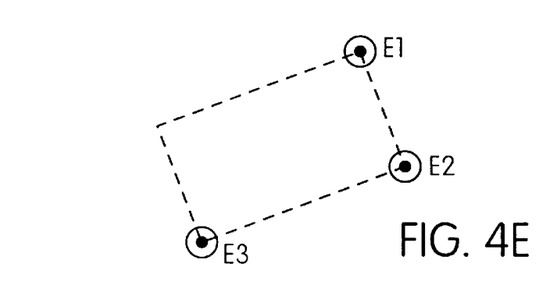

Once corresponding features are identified, they are fit against model input 414D to determine generally rectangular device position at 303B (same as 506 in FIG. 5), as shown in FIG. 4E. More specifically, the corresponding features (E1, E2, E3) identified at 303A are fit against a generally rectangular device model input 414D using a known fitting algorithm, for example, a three-parameter least squares fit or some other geometrical fitting algorithm. Preferably the rigid-body least squares fit (involving a 2D translation and a rotation) is used.

The fitting algorithm output provides the coarse part location. It may be used to calculate the generally rectangular device position, for example, the center and orientation which can be mapped to the physical space using the calibration data which is updated at 301 and 302, as necessary.

FIGS. 5 and 6A–6F describe features of a process performed by the illustrated embodiment of the present invention for determining correspondence between boundary features identified from within an image and corners of a generally rectangular device represented by that image.

Figure 5:
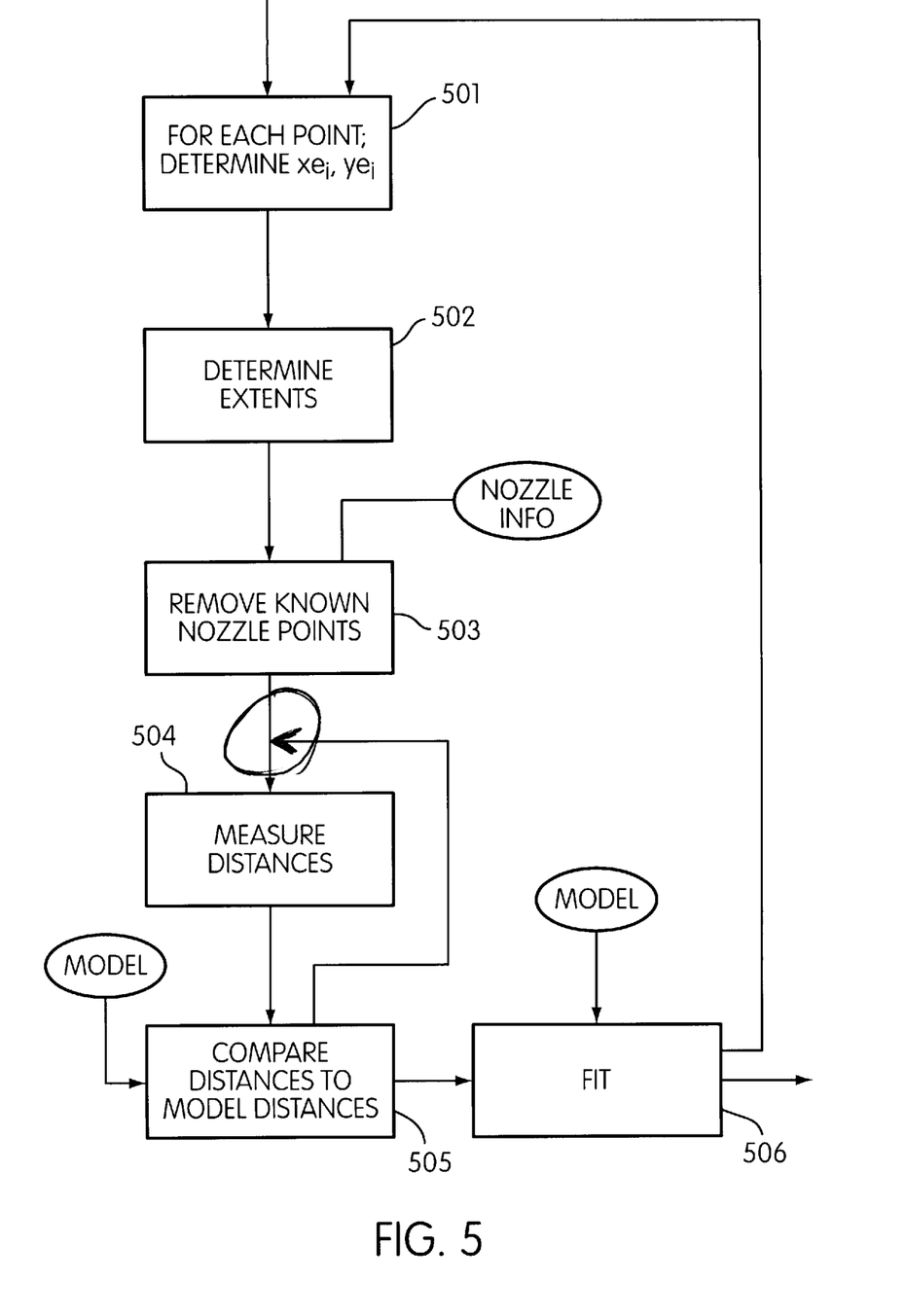
FIG. 5 is a block diagram showing a process for determining correspondence between points of the image and a model of an article whose position is being determined.

Inputs to the correspondence process shown in FIG. 5 include a list of extracted features, the presentation angle, nozzle information and modeling constraints. The list of extracted features are those extracted at 302. For instance, in the example of FIG. 4C, the list may include points corresponding to the boundary features shown in that figure. The other inputs are the same as those described above with respect to the CPL process of FIG. 3A.

Figure 6A:
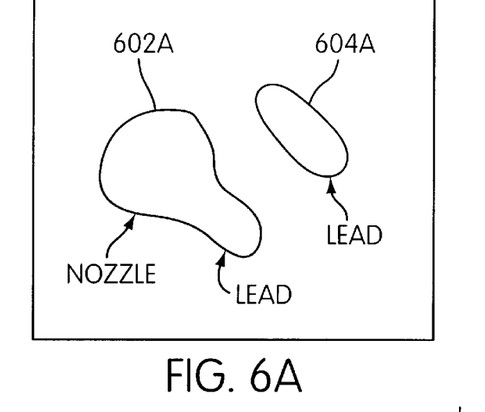
FIGS. 6A–6F illustrate how an image is manipulated according to the process of FIG. 5.
Figure 6B:
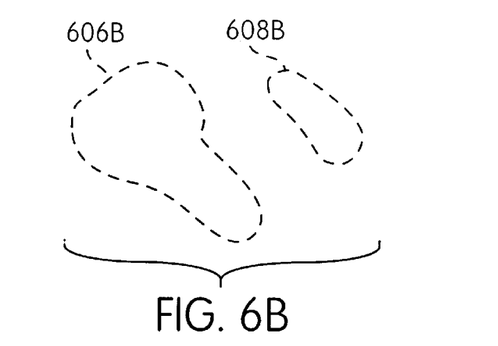

Prior to performing the correspondence (501–505, same as 303A) and fitting (506, same as 303B) processes illustrated by FIG. 5, sub-processes 301 and 302 of the CPL process are performed as previously described with respect to FIG. 3A. Consequently, regions such as those shown in FIG. 6A (602A, 604A) are generated based on the thresholding at 301, and boundary points (606B and 608B, corresponding to regions 602A and 604A in FIG. 6A) such as those shown in FIG. 6B are identified through the feature extraction at 302.

Figure 6C:
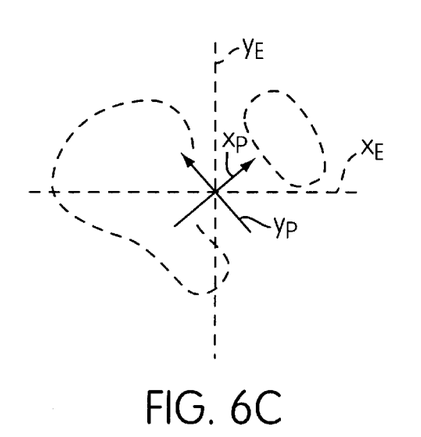
Figure 6D:
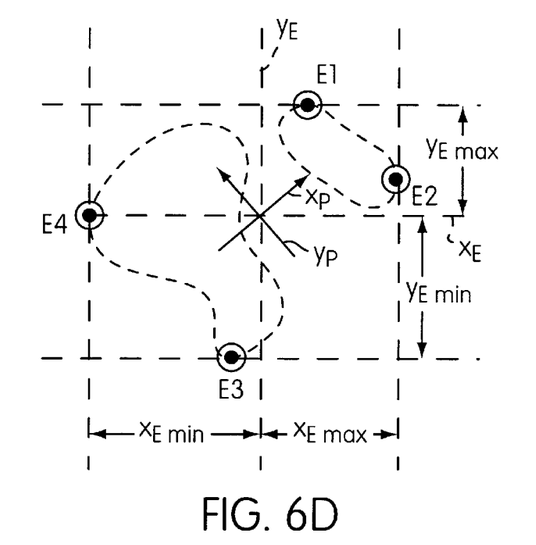

At 501, the list of boundary points ($x_i$, $y_i$) are transformed from the image coordinate space into an extents coordinate space ($x_{Ei}$, $y_{Ei}$). The extents coordinate space is shown in FIG. 6C as a coordinate space which is fixed in relation to the coordinate space corresponding to the initial expected device orientation. Therefore, the axes ($X_E$, $Y_E$) of the extents coordinate space are offset by a fixed angle, for example, 45°, from the axes ($X_p$, $Y_p$) of the coordinate space corresponding to the image-space presentation angle (determined by mapping the physical space presentation angle via the calibration) representing the initial expected device orientation as it appears in the image. Because the relationship between the image coordinate space and the initial expected device orientation is described by the presentation angle and the relationship between the initial expected device orientation and the extents coordinate space is fixed, a relationship between the image coordinate system and the extents coordinate system can be determined and described using common trigonometric formulas.

For instance, assuming that a presentation angle of P degrees relates the initial expected device orientation to the image space and that a fixed angle of 45 degrees relates the extents coordinate space to the presentation angle, points in the image coordinate space can be translated into extents coordinate space based on the following relationships:

$$x_{Ei}=(x_i-x_p)\cos(45°-P)-(y_i-y_p)\sin(45°-P) \quad (1),$$

$$y_{Ei}=(x_i-x_p)\sin(45°-P)+(y_i-y_p)\cos(45°-P) \quad (2),$$

which, through trigonometric manipulation, become:

$$x_{Ei}=x_i\cos(45°-P)-Y_i\sin(45°-P)+x_p\cos(45°-P)-Y_p\sin(45°-P), \quad (3)$$

$$y_{Ei}=y_i\sin(45°-P)-Y_i\cos(45°-P)+y_p\sin(45°-P)-Y_p\cos(45°-P), \quad (4)$$

or, $$x_{Ei}=x_i\cos(45°-P)-y_i\sin(45°-P)+kx, \quad (5)$$

$$y_{Ei}=x_i\sin(45°-P)+y_i\cos(45°-P)+ky, \quad (6)$$

where kx and ky are constants. Furthermore, if indices i are used to relate the computed points from extents space back to corresponding points in the image space, the relative positions of points in the extent space will suffice for the processes performed in the remainder of this process because the points defining extents are the same regardless of translation or uniform scaling. Consequently, constants kx and ky which only provide translational information may be disregarded in relationships (5)–(6). As such, points in the extent coordinate space may be derived from the boundary features based on:

$$x_{Ei}=x_i\cos(45°-P)-y_i\sin(45°-P) \quad (7)$$

$$y_{Ei}=x_i\sin(45°-P)+y_i\cos(45°-P) \quad (8)$$

In these equations, $\cos(45°-P)$ and $\sin(45°-P)$ can be determined before transforming all the points because they do not vary for each i. Consequently, each of the points $x_{Ei}$ and $y_{Ei}$ can be determined using only two multiplications and a single addition (or subtraction). Furthermore, because each of these relationships is based on the calculation of $\sin(45°-P)$ and $\cos(45°-P)$, when there is no aspect ratio or skew in the calibration, they can each be further simplified to a direct mapping where $x_{Ei}=x_i$ and $y_{Ei}=y_i$ when the angle (45°–P) is equal to 0°. Direct mapping is possible under such circumstances because an angle (45°–P) of 0° implies that the extent coordinate system is the same as the image coordinate system. Similarly, when the angle (45°–P) is 90°, $x_{Ei}=-y_i$ and $y_{Ei}=x_i$ because a rotation of 90° implies that the abscissa and ordinate are switched. Furthermore, since sine and cosine are equivalent at 45°, relationships (5) and (6) are simplified to a single term when angle (45°–P) is equal to 45°:

$$x_{Ei}=x_i-y_i \quad (9)$$

$$y_{Ei}=x_i+y_i, \quad (10)$$

since sine and cosine are equivalent in this case and the extents are invariant under uniform scaling. Using equations (9) and (10), each point $x_{Ei}$ and $y_{Ei}$ can be determined with only 2 additions (or subtractions). Therefore, in the special cases where the angle (45°–P) is equal to 0°, 45°, 90° or any angle (45°–P) equal to a multiple of 45°, calculations are simplified and calculation times are reduced.

At 502, the boundary points transformed at 501 are evaluated to determine maximum ($x_{max}$, $y_{max}$) and minimum ($x_{min}$, $y_{min}$) values with respect to each of extents axes $X_E$ and $Y_E$, which values define the extents. These extents are determined by minimum and maximum x and y positions of all the boundary points in the extents coordinate space. Both the extents and the extents points may be determined by comparing and updating the maximum and minimum values ($x_{max}$, $y_{max}$, $x_{min}$, and $y_{min}$) with each boundary point, $x_{Ei}$, $y_{Ei}$. The resulting extents points are shown, for example, as E1–E4 (in FIG. 6D). Extents points in the extents coordinate space correspond to corner points in the image coordinate space.

Indices may be associated and updated with the extents points. Indices may be used to determine corner points within the image coordinate space corresponding to the extents points without requiring any further computation. For example, the following algorithm may be used to compute extents points and update corresponding indices:

if $x_{min}>x_{Ei}$
  $x_{min}=x_{Ei}$
  minX_i=i else if $x_{max} < x_{Ei}$
  $x_{max} = x_{Ei}$
  maxX_i=i
if $y_{min} < y_{Ei}$
  $y_{min} = y_{Ei}$
  minY_i=i
else if $y_{max} < y_{Ei}$
  $y_{max} = y_{Ei}$
  maxY_i=i.

In this algorithm, $x_{min}$, $x_{max}$, $y_{min}$ and $y_{max}$ correspond to extents in the extents coordinate space. The index maxX_i corresponds to the upper right corner of the chip, that given by minX_i to the lower left corner, that given by maxY_i to the upper left, and the that given by minY_i to the lower right. Using these relationships, corner points in the image coordinate space may be determined based on the extents points in the extents coordinate space without performing complex complete mapping or rotating operations. Alternatively, if the extents points are calculated using relationships (1)–(8) without using indexes, the extents points of the extents coordinate space may be translated into corner points of the image coordinate space using trigonometric relationships similar to relationships (1)–(8).

At 503, nozzle information is used to remove corner points corresponding to known nozzle points. Nozzle information may be in the form of a model, or a list of points in the physical or image space. Conventional techniques such as masking or point-by-point comparison may be used to identify and remove corner points corresponding to the nozzle at this stage. Similarly, information related to other objects known to show up in the image may be used to remove corner points believed to correspond to those objects.

Figure 6E:
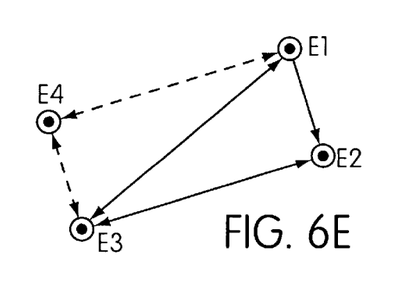

Corner-to-corner distances or other geometric features are calculated with respect to the remaining corner points (at 504). For instance, as shown in FIG. 6E, distances between the corner points can be measured.

Geographic features are calculated with respect to the remaining corner points and compared against model constraints (at 505). Corner points corresponding to geometric features falling outside of the model constraints are discarded. For instance, corner point E4 is discarded in FIG. 6D because the distances from E4 to other corner points were not within the range defined by the model input. It should be noted that corner points may also be discarded at 503 if they correspond to known nozzle points.

Figure 6F:
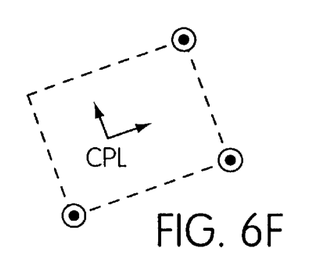

The remaining corner points are fit against a model input to determine coarse part location (at 506). That is, the remaining corner points, for example, E1–E3, are then used to determine the orientation and position of the article, as shown in FIG. 6F. As described previously, known fitting algorithms may be used to fit the remaining corner points to a generally rectangular device model input.

As illustrated by FIG. 5, the output of the processing at 506 (same as 303B) may be used to provide coarse part location, or it may be recirculated and input to another coarse part location process, where it may be used as an initial estimate of generally rectangular device location. This may be particularly useful for generally rectangular devices having very rounded corners. Although described above as determining position, the illustrated CPL process may be used to determine other criteria such as the pose, location, and/or orientation. The pose is the full set of transformational parameters that characterize the mapping of the device into the image. The pose includes at least one of scaling parameters, rotational orientation, translation parameters, deformation parameters, morphing parameters, or any other transformational parameters.

Furthermore, the specifics of any particular embodiment of the present invention may vary widely, depending upon many different factors—the specific environment within with the present invention is implemented being just one example. Further example details and descriptions are provided in the Cognex *SMD Placement Guidance Package User's Manual*, Release 3.2, the content of which is hereby expressly incorporated by reference herein in its entirety. As described, this invention operates in image space. operation in other spaces is also contemplated. For example, if the mapping from physical space to image space has a large aspect ratio, skew or is highly non-linear, the processes may operate in physical space.

This invention can be implemented in software, hardware or any combination thereof. The invention can be on a dedicated machine, and ASIC and the like. When implemented fully or partially in software, the invention can reside, permanently or temporarily, on any memory or storage medium, including but not limited to a RAM, a ROM, a disk, an ASIC, a PROM and the like.

While the invention has been described by way of example embodiments, it is understood that the words which have been used herein are words of description, rather than words of limitation. changes may be made, within the purview of appended claims, without departing from the scope and spirit of the invention in its broader aspects. Although the invention has been described herein with reference to particular structure, materials, and embodiments, it is understood that the invention is not limited to the particulars disclosed. The invention extends to all equivalent structures, means, and uses which are within the scope of the appended claims.

What is claimed is:

1. A method for identifying and locating the boundaries of a generally rectangular device, said method comprising:

detecting, from a two-dimensional image including a pixel representation of said device, a boundary of said device by locating multiple boundary points lying on a boundary of an object within said two-dimensional image and by representing each of said multiple boundary points with a respective set of first and second cartesian boundary coordinate values respectively defining positions along first and second intersecting axes lying in a plane in common with said two-dimensional image, each of said first and second intersecting axes having an angular position substantially 45° displaced from a straight line estimated to be parallel to an edge of said device; and identifying corner points of said device by determining which ones of said respective sets of first and second cartesian boundary coordinate values include at least one of a highest and a lowest of said first cartesian boundary coordinate values and a highest and a lowest of said second cartesian boundary coordinate values.

2. A method according to claim 1, further comprising determining which of said identified corner points is incorrectly identified as a corner point based upon geometric features calculated based upon said identified corner points and compared against model constraints.

3. The method according to claim 2, further comprising determining which of said identified corner points is incorrectly identified as a corner point based upon known information concerning an object other than said device.

4. The method according to claim 1, wherein said two-dimensional image comprises a thresholded image.

5. The method according to claim 4, wherein said two-dimensional thresholded image comprises a front-lit representation of a rectangular surface mount device having chip lead portions at an end thereof, said surface mount device being held by a nozzle.

6. The method according to claim 4, wherein said multiple boundary points intersect a boundaries of plural regions of said device.

7. The method according to claim 6, wherein said detecting of said boundary of said device comprises running a boundary tracker tool.

8. The method according to claim 6, wherein said detecting of said boundary of said device comprises running a region image processing tool.

9. The method according to claim 1, further comprising fitting the corner points against an input model representation of said device to determine coarse part location information concerning said device.

10. The method according to claim 9, wherein said fitting comprises using a three-parameter least squares fit algorithm.

11. The method according to claim 9, wherein said fitting comprises using a rigid-body least squares fit algorithm performing a two-dimensional translation and a rotation.

12. The method according to claim 1, wherein:
said corner points are identified using the following algorithm:
if $x_{min} > x_{Ei}$
  $x_{min} > x_{Ei}$
  minX__i=i
else if $x_{max} < x_{Ei}$
  $x_{max} = x_{Ei}$
  maxX__i=i
if $y_{min} > y_{Ei}$
  $y_{min} > y_{Ei}$
  minY__i=i
else if $y_{max} < y_{Ei}$
  $y_{max} = y_{Ei}$
  maxY__i=i;
wherein $x_{Ei} = x_i - y_i$ and $y_{Ei} = x_i + y_i$, where $x_i$ is an x axis coordinate of a given boundary point i, and $y_i$ is a y axis coordinate of the same boundary point.

13. The method according to claim 1, further comprising ascertaining said first and second intersecting axes, said ascertaining comprising determining an orientation and location of the generally rectangular device.

14. The method according to claim 1, further comprising ascertaining said first and second intersecting axes, said ascertaining comprising determining a pose of the generally rectangular device.

15. Computer-readable media tangibly embodying a program executable by a machine to identify and locate the boundaries of a generally rectangular device, said program performing functions comprising:
detecting, from a two-dimensional image including a pixel representation of said device, a boundary of said device by locating multiple boundary points lying on a boundary of an object within said two-dimensional image and by representing each of said multiple boundary points with a respective set of first and second cartesian boundary coordinate values respectively defining positions along first and second intersecting axes lying in a plane in common with said two-dimensional image, each of said first and second intersecting axes having an angular position substantially 45° displaced from a straight line estimated to be parallel to an edge of said device; and
identifying corner points of said device by determining which ones of said respective sets of first and second cartesian boundary coordinate values include at least one of a highest and a lowest of said first cartesian boundary coordinate values and a highest and a lowest of said second cartesian boundary coordinate values.

16. The media according to claim 15, said functions further comprising determining which of said identified corner points is incorrectly identified as a corner point based upon geometric features calculated based upon said identified corner points and compared against model constraints.

17. The media according to claim 16, said functions further comprising determining which of said identified corner points is incorrectly identified as a corner point based upon known information concerning an object other than said device.

18. The media according to claim 15, wherein said two-dimensional image comprises a thresholded image.

19. The media according to claim 18, wherein said two-dimensional thresholded image comprises a front-lit representation of a rectangular surface mount device having chip lead portions at an end thereof, said surface mount device being held by a nozzle.

20. The media according to claim 18, wherein said multiple boundary points intersect boundaries of plural regions of said device.

21. The media according to claim 20, wherein said detecting of said boundary of said device comprises running a boundary tracker tool.

22. The media according to claim 20, wherein said detecting of said boundary of said device comprises running a region image processing tool.

23. The media according to claim 15, said functions further comprising fitting the corner points against an input model representation of said device to determine coarse part location information concerning said device.

24. The media according to claim 23, wherein said fitting comprises using a three-parameter least squares fit algorithm.

25. The media according to claim 23, wherein said fitting comprises using a rigid-body least squares fit algorithm performing a two-dimensional translation and a rotation.

26. The media according to claim 15, wherein:
said corner points are identified using the following algorithm:
if $x_{min} > x_{Ei}$
  $x_{min} > x_{Ei}$
  minX__i=i
else if $x_{max} < x_{Ei}$
  $x_{max} = x_{Ei}$
  maxX__i=i
if $y_{min} > y_{Ei}$
  $y_{min} = y_{Ei}$
  minY__i=i
else if $y_{max} < y_{Ei}$
  $y_{max} = y_{Ei}$
  maxY__i=i;
wherein $x_{Ei} = x_i - y_i$ and $y_{Ei} = x_i + y_i$, where $x_i$ is an x axes coordinate of a given boundary point i, and $y_i$ is a y axis coordinate of the same boundary point.

27. The media according to claim 15, said functions further comprising ascertaining said first and second intersecting axes, said ascertaining comprising determining an orientation and location of the generally rectangular device.

28. The media according to claim 15, said functions comprising ascertaining said first and second intersecting axes, said ascertaining comprising determining a pose of the generally rectangular device.

29. A system for identifying and locating the boundaries of a generally rectangular device, said system comprising:

means for detecting, from a two-dimensional image including a pixel representation of said device, a boundary of said device by locating multiple boundary points lying on a boundary of an object within said two-dimensional image and by representing each of said multiple boundary points with a respective set of first and second cartesian boundary coordinate values respectively defining positions along first and second intersecting axes lying in a plane in common with said two-dimensional image, each of said first and second intersecting axes having an angular position substantially 45° displaced from a straight line estimated to be parallel to an edge of said device; and means identifying corner points of said device by determining which ones of said respective sets of first and second cartesian boundary coordinate values include at least one of a highest and a lowest of said first cartesian boundary coordinate values and a highest and a lowest of said second cartesian boundary coordinate values.

30. The system according to claim 29, further comprising means for determining which of said identified corner points is incorrectly identified as a corner point based upon geometric features calculated based upon said identified corner points and compared against model constraints.

31. The system according to claim 30, further comprising means for determining which of said identified corner points is incorrectly identified as a corner point based upon known information concerning an object other than said device.

32. The system according to claim 29, wherein said two-dimensional image comprises a thresholded image.

33. The system according to claim 32, wherein said two-dimensional thresholded image comprises a front-lit representation of a rectangular surface mount device having chip lead portions at an end thereof, said surface mount device being held by a nozzle.

34. The system according to claim 32, wherein said multiple boundary points intersect boundaries of plural regions of said device.

35. The system according to claim 34, wherein said detecting of said boundary of said device comprises running a boundary tracker tool.

36. The system according to claim 34, wherein said detecting of said boundary of said device comprises running a region image processing tool.

37. The system according to claim 29, further comprising fitting the corner points against an input model representation of said device to determine coarse part location information concerning said device.

38. The system according to claim 37, wherein said fitting comprises using a threeparameter least squares fit algorithm.

39. The system according to claim 37, wherein said fitting comprises using a rigidbody least squares fit algorithm performing a two-dimensional translation and a rotation.

40. The system according to claim 29, wherein:

said corner points are identified using the following algorithm:

if $x_{min} > x_{Ei}$
 $x_{min} > x_{Ei}$
 minX__i=i
else if $x_{max} < x_{Ei}$
 $x_{max} = x_{Ei}$
 maxX__l i=i
if $y_{min} > y_{Ei}$
 $y_{min} = y_{Ei}$
 minY__i=i
else if $y_{max} < _{Ei}$
 $y_{max} = y_{Ei}$
 maxY__l=i;

wherein $x_{Ei} = x_i - y_i$ and $y_{Ei} = x_i + y_i$, where $x_i$ is an x axis coordinate of a given boundary point i, and $y_i$ is a y axis coordinate of the same boundary point.

41. The system according to claim 29, further comprising ascertaining said first and second intersecting axes, said ascertaining comprising determining an orientation and location of the generally rectangular device.

42. The system according to claim 29, further comprising ascertaining said first and second intersecting axes, said ascertaining comprising determining a pose of the generally rectangular device.

* * * * *